(12) United States Patent
Gossain et al.

(10) Patent No.: US 8,577,300 B2
(45) Date of Patent: Nov. 5, 2013

(54) SUPPORT FOR WIRELESS RADIO DEVICE IN MULTIPLE WIRELESS REGULATORY DOMAINS

(75) Inventors: Hrishikesh Gossain, Heathrow, FL (US); Robin U. Roberts, Orlando, FL (US); Donald L. Joslyn, DeBary, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 292 days.

(21) Appl. No.: 13/082,750

(22) Filed: Apr. 8, 2011

(65) Prior Publication Data

US 2012/0258670 A1 Oct. 11, 2012

(51) Int. Cl.
 H04B 7/00 (2006.01)
 H04W 4/00 (2009.01)
 H04W 24/00 (2009.01)

(52) U.S. Cl.
 USPC ............... 455/66.1; 455/435.1; 455/456.1

(58) Field of Classification Search
 USPC ............ 455/414.2, 435.1, 456.1, 456.3, 62, 455/63.1, 66.1, 67.11, 67.13, 550.1
 See application file for complete search history.

(56) References Cited

U.S. PATENT DOCUMENTS

| | | | |
|---|---|---|---|
| 5,608,727 A | 3/1997 | Perreault et al. | |
| 6,173,159 B1 | 1/2001 | Wright et al. | |
| 7,274,911 B2 * | 9/2007 | Li | 455/41.2 |
| 7,970,430 B2 * | 6/2011 | Backof et al. | 455/550.1 |
| 8,135,384 B2 * | 3/2012 | Hassan et al. | 455/410 |
| 8,165,153 B2 * | 4/2012 | Kaidar et al. | 370/447 |
| 2004/0087310 A1 | 5/2004 | Williamson et al. | |
| 2006/0031082 A1 | 2/2006 | Amaitis et al. | |
| 2006/0083205 A1 | 4/2006 | Buddhikot et al. | |
| 2006/0143111 A1 | 6/2006 | Mylet | |
| 2006/0182169 A1 | 8/2006 | Belge et al. | |
| 2006/0218392 A1 | 9/2006 | Johnston | |
| 2007/0274404 A1 | 11/2007 | Papandriopoulos et al. | |
| 2008/0052387 A1 | 2/2008 | Heinz et al. | |
| 2008/0108365 A1 | 5/2008 | Buddhikot et al. | |
| 2008/0176581 A1 * | 7/2008 | Abdel-Kader | 455/456.2 |
| 2008/0221951 A1 | 9/2008 | Stanforth et al. | |
| 2008/0222019 A1 | 9/2008 | Stanforth et al. | |
| 2008/0222021 A1 | 9/2008 | Stanforth et al. | |
| 2009/0046625 A1 | 2/2009 | Diener et al. | |
| 2009/0197627 A1 | 8/2009 | Kuffner et al. | |
| 2010/0214958 A1 * | 8/2010 | Wijayanathan et al. | 370/255 |

(Continued)

OTHER PUBLICATIONS

International Search Report and Written Opinion from corresponding International Application No. PCT/US12/30004 dated Jun. 28, 2012.

(Continued)

*Primary Examiner* — Andrew Wendell
(74) *Attorney, Agent, or Firm* — Renner, Otto, Boisselle & Sklar, LLP (57) ABSTRACT

A system and method for automatically configuring operating parameters of a wireless radio device. The wireless radio device determines a geographic location of the wireless radio device, and a determination is made as to the regulatory domain in which the wireless radio device is located based on the geographic location of the wireless radio device. The wireless radio device may register with and/or receive configuration information from the server associated with the regulatory domain in which the wireless radio device is located. The wireless radio device configures the operating parameters of the wireless device in accordance with configuration parameters associated with the determined regulatory domain.

21 Claims, 7 Drawing Sheets

(56) References Cited

U.S. PATENT DOCUMENTS

| | | | |
|---|---|---|---|
| 2010/0261423 A1 | 10/2010 | Stanforth et al. | |
| 2011/0090887 A1* | 4/2011 | Kim et al. | 370/338 |
| 2012/0052876 A1* | 3/2012 | Anderson et al. | 455/456.1 |
| 2012/0166671 A1* | 6/2012 | Qi et al. | 709/236 |
| 2012/0184318 A1* | 7/2012 | Lee et al. | 455/515 |
| 2012/0289253 A1* | 11/2012 | Haag et al. | 455/456.2 |

OTHER PUBLICATIONS

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

Jones, Steven K. et al., "Initial Evaluation of the Performance of Prototype TV-Band White Space Devices", (2007), OET Report, FCC/OET 07-TR-1006.

47 C.F.R. 15.713, Jan. 4, 2012.

By the Commission, "Second Report and Order, Order on Reconsideration, and Second Further Notice of Proposed Rulemaking", Federal Communications Commission, 2004, FCC 04-167, WT Docket No. 00-230, pp. 1-180.

Kwerel, Evan et al., "A Proposal for a Rapid Transition to Market Allocation of Spectrum", Federal Communications Commission, 2002, OPP Working Paper No. 38, pp. 1-50.

Prabhu, Krish et al., "Time for Action" Genuine Ideas, 2002, [retrieved online Feb. 1, 2008], <http://www.genuineideas.com/ArticlesIndex/TimeForAction.htm>.

\* cited by examiner

SUPPORT FOR WIRELESS RADIO DEVICE IN MULTIPLE WIRELESS REGULATORY DOMAINS

TECHNICAL FIELD

The technology of the present disclosure relates generally to wireless communications infrastructure and, more particularly, to a system and method for automatically configuring operating parameters of a wireless radio device.

BACKGROUND

Wireless networks and systems are becoming increasingly popular. But wireless communications are constrained due to a lack of available, interference free spectrum that may be used for reliable communications within a geographic area.

In the U.S., some spectrum may be used without a license, but regulations on the spectrum may be imposed. For example, analog television (TV) broadcasts have been eliminated in favor of digital TV broadcasts. This frees spectrum channels for use by unlicensed radio systems to offer various services, such as mobile communications and Internet access. The available spectrum is commonly referred to as TV whitespace. In the case of TV whitespace, the whitespace is comprised of unused TV channels between channel 2 and channel 51 (corresponding to 54 MHz to 698 MHz).

To avoid interference with digital TV broadcasts and other incumbent systems, such as wireless microphone systems, wireless radio devices in a regulatory domain that use the TV whitespace will be required to request and receive a channel map of available channels that may be used for the communications activity of the wireless radio system. Also, for portable or mobile wireless radio devices, if the wireless radio device moves into a new location in a regulatory domain, request of a channel map of available channels that may be used for the new location is required. Additional information regarding the regulation of TV whitespace may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

Due much in part to the lack of available, interference free spectrum and the various regulations imposed on wireless radio devices, radio devices used for wireless network communication are generally only permitted to operate in those regulatory domains (e.g., countries or regions) that have granted certification. Accordingly, it is commonplace for manufacturers to configure the device's operating country code before the device is shipped to the customer (e.g., distributor, retailer, consumer, end-user) to ensure that the device operates within the rules set within the regulatory domain where the device will operate. But it is very difficult to manage the configuration of country codes on network devices.

Manufacturers or distributors that ship radio devices to multiple countries may be faced with a major issue when devices that have already been preconfigured for a specific regulatory domain (associated with a particular country code) are reassigned for delivery to a different regulatory domain (associated with a different country code), especially if the devices have already been packaged. This reconfiguration process is costly, time consuming, and prone to error. In some cases, the manufacturer may even need to unpack devices that have already been packed and sealed for shipping, just to change the country code on the devices. The manufacturers or distributors also usually keep separate spare inventories of devices used to replace devices that malfunction. The manufacturer or distributor is forced to have an inventory for each regulatory domain due to the fact that the devices are configured with a fixed country code.

One possible solution is to allow the customer to choose the country code of the device. But a number of regulatory domains will not permit the importation of radio devices that allow for post-import configuration (i.e. by the customer). When a device can be configured by the customer, there is no method to ensure that the country code is properly chosen. Hence, the manufacturers often must prove that the country code is fixed and cannot be changed by the customer.

The inability of the customer to configure the country code further presents issues for individual wireless radio devices that are to be used in multiple regulatory domains. For example, a wireless radio device configured to operate in a first country associated with one regulatory domain that is taken to a second country associated with a different regulatory domain may not be easily reconfigured to operate in accordance with the regulations imposed on wireless radio devices in the second country.

SUMMARY OF THE INVENTION

The present disclosure provides a system and method for automatically configuring operating parameters of a wireless radio device. The principles of the present disclosure provide advantages associated with multi-regulatory domain distribution of wireless radio devices by addressing the shortcomings associated with conventional wireless radio device configuration. As discussed herein, the present disclosure allows a device to be dynamically configured in accordance with country code of a regulatory domain upon initialization. Hence, the manufacturer or distributor is no longer required to configure a country code before shipping the product to the customer. The regulatory domains are assured the device will be configured with the proper country code and will operate using the proper operation parameter(s) because the wireless radio device determines its location and queries a server to determine configuration information such as the regulatory domain in which the wireless radio device is located and/or one or more configuration parameters for configuring the wireless radio device. As a result, simpler logistical and inventory control techniques may be used by the manufacturers and distributors, and ease of use is achieved for end users.

The principles of the present disclosure further provide the advantage of allowing the regulatory domain (country code) and associated operating parameters of a wireless radio device to be dynamically reconfigured upon entry of the wireless radio device into a different regulatory domain.

According to one aspect of the disclosure, a method of automatically configuring operating parameters of a wireless radio device includes: determining, with the wireless radio device, a geographic location of the wireless radio device; determining the regulatory domain in which the wireless radio device is located based on the geographic location of the wireless radio device; and configuring, with the wireless radio device, the operating parameters of the wireless device in accordance with configuration parameters associated with the determined regulatory domain.

According to one embodiment, the regulatory domain is determined with the wireless radio device.

According to another embodiment, the determined geographic location is matched with a regulatory domain associated with the determined geographic location.

According to another embodiment, the method further includes: requesting the configuration parameters associated with the determined regulatory domain from a server, the request including the determined regulatory domain; and receiving the configuration parameters from the server. According to another embodiment, the request further includes at least one of certification information, device identification information, device type, or one or more supported bands of operation.

According to another embodiment, the regulatory domain is determined by requesting regulatory domain information from a server, the request including the geographic location of the wireless radio device; and receiving an identification of the regulatory domain from the server in response to the request. According to another embodiment, the request further includes at least one of certification information, device identification information, device type, one or more supported bands of operation, or a list of one or more supported regulatory domains. According to another embodiment, the method further includes receiving the configuration parameters associated with the determined regulatory domain from the server in response to the request. According to another embodiment, the configuration parameters are stored at the wireless radio device, and the configuration parameters are selected based on the received identification of the determined regulatory domain.

According to another embodiment, the configuration parameters include maximum transmit power.

According to another embodiment, the configuration parameters include at least one available channel.

According to another aspect of the disclosure, a method of automatically configuring operating parameters of a wireless radio device includes: receiving a configuration information request from a wireless radio device, the configuration information request including information associated with a geographic location of the wireless radio device; determining, with a server, configuration information in accordance with a regulatory domain associated with the geographic location of the wireless radio device; and sending the configuration information from the server to the wireless radio device, the configuration information including information for configuring the operating parameters of the wireless device.

According to one embodiment, the regulatory domain is determined by the wireless radio device, and the configuration information request includes an identification of the regulatory domain of the wireless radio device. According to another embodiment, the determined configuration information includes configuration parameters associated with the regulatory domain of the wireless radio device associated with the regulatory domain of the wireless radio device. According to another embodiment, the configuration parameters include at least one of maximum transmit power or an available channel.

According to another embodiment, the configuration information request includes the geographic location of the wireless radio device, and the determined configuration information includes an identification of the regulatory domain associated with the geographic location of the wireless radio device. According to another embodiment, the determined configuration information further includes configuration parameters. According to another embodiment, the configuration parameters include at least one of maximum transmit power or an available channel.

According to another embodiment, the configuration information request further includes at least one of certification information, device identification information, device type, one or more supported bands of operation, or a list of one or more supported regulatory domains.

According to another embodiment, the server further determines the configuration information in accordance with elevation information associated with the geographic location of the wireless radio device.

According to another aspect of the disclosure, a wireless radio device configured to automatically configure operating parameters includes: a geo-location function stored on a memory of the wireless radio device and executable by a processor of the wireless radio device to determine, with the wireless radio device, a geographic location of the wireless radio device; and a regulatory domain configuration function stored on the memory and executable by the processor to: determine the regulatory domain in which the wireless radio device is located based on the geographic location of the wireless radio device; and configure, with the wireless radio device, the operating parameters of the wireless device in accordance with configuration parameters associated with the determined regulatory domain.

According to one embodiment, the regulatory domain is determined with the wireless radio device. According to another embodiment, the regulatory domain configuration function is further executable by the processor to: request the configuration parameters associated with the determined regulatory domain from a server, the request including the determined regulatory domain; and receive the configuration parameters from the server.

According to another embodiment, the regulatory domain is determined by requesting regulatory domain information from a server, the request including the geographic location of the wireless radio device; and receiving an identification of the regulatory domain from the server in response to the request. According to another embodiment, the configuration parameters associated with the determined regulatory domain are received from the server in response to the request. According to another embodiment, the configuration parameters are stored at the wireless radio device, and the configuration parameters are selected based on the received identification of the determined regulatory domain.

The foregoing and other features of the disclosure are hereinafter described in greater detail with reference to the accompanying drawings.

DESCRIPTION

In the description that follows, like components have been given the same reference numerals, regardless of whether they are shown in different embodiments. To illustrate an embodiment(s) of the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

The techniques that are described in this document may be applied for any type of radio that operates on domain-related criteria. Therefore, even though aspects of the disclosure are described in the context of the use and/or allocation of whitespaces, there is clearly utility and application of the described techniques in any applicable context for wireless communications. The methods and systems may be applied to licensed or unlicensed spectrum. Furthermore, the methods and systems are generic to modulation schemes, harmonic considerations, frequency bands or channels used by the wireless radio devices, the type of data or information that is transmitted, how the wireless radio devices use received information, and other similar communications considerations. Thus, the systems and methods have application in any suitable environment. In addition, the systems and methods are described in the exemplary context of managing radio devices that utilize TV whitespace. However, the systems and methods may be applied to other circumstances where wireless radio devices operate under location-related considerations.

Figure 1:
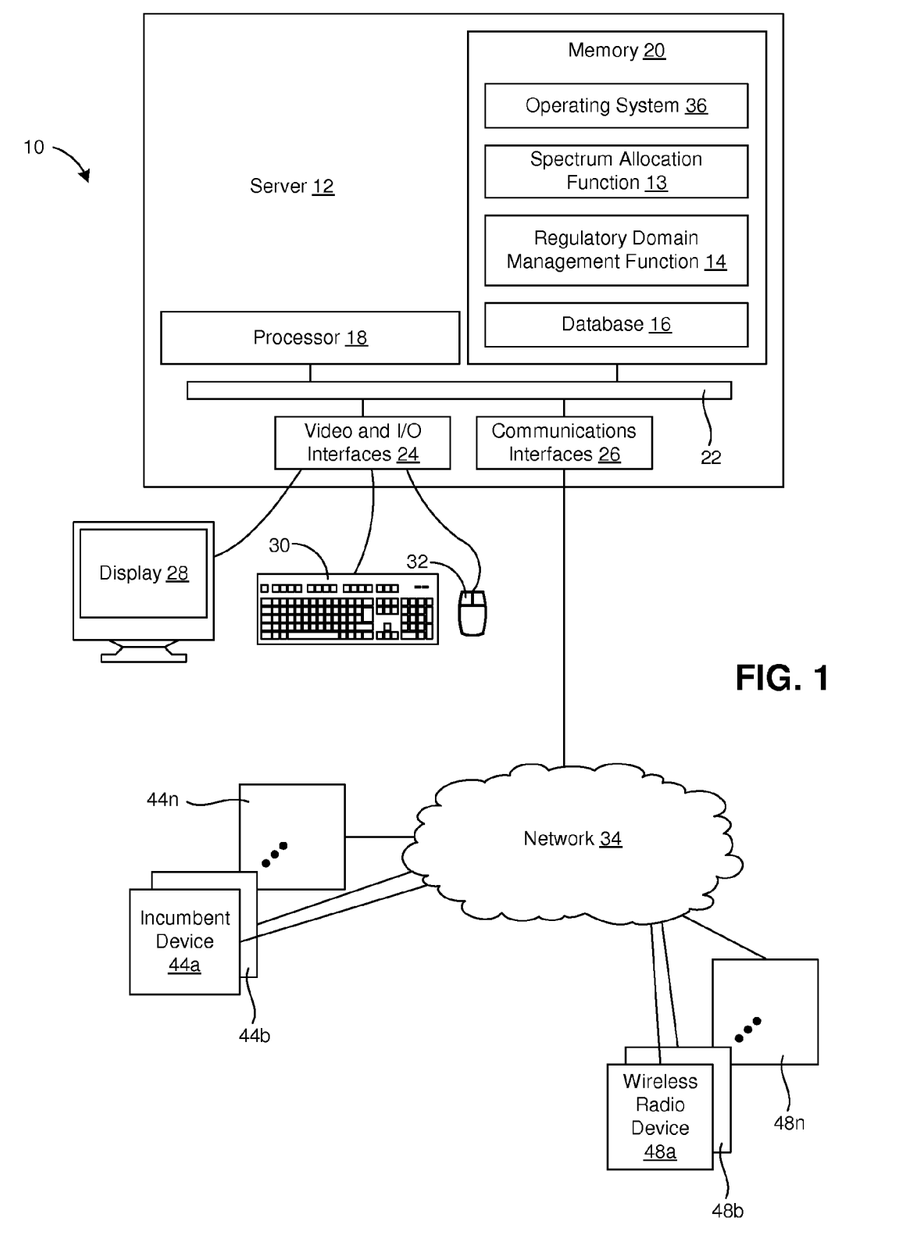
FIG. 1 is a schematic view of an exemplary system for managing spectrum allocation.

With reference to FIG. 1, illustrated is a schematic block diagram of a computer-based system 10 capable of executing computer applications (e.g., software programs). The system 10 may include a server 12 that is implemented using computer technology. The server 12 may be configured to execute various functions such as a spectrum allocation function 13 and regulatory domain management function 14.

The spectrum allocation function 13 is configured to perform spectrum management functions such as providing spectrum certificates or channel maps to qualified systems and devices so that such systems and devices may make use of spectrum for wireless communications. Additional information regarding spectrum allocation may be found in U.S. Patent Application Publication No. 2010/0261423, the entirety of which is incorporated herein by reference.

The regulatory domain management function 14 is configured to perform registration functions such as receiving a registration request from a wireless radio device 48, registering the wireless radio device with the server 12, and providing a registration response to the wireless radio device. The regulatory domain management function 14 is also configured to perform wireless radio device configuration functions such as receiving a configuration information request from a wireless radio device and providing configuration information to the wireless radio device. The details regarding the operation of the regulatory domain configuration function 14 are described in more detail below.

In one embodiment, the server 12 executes the spectrum allocation function 13 and regulatory domain management function 14 to host one or more wireless radio device support functions for one or more regulatory domains. The wireless radio device support functions include such functionalities as accepting registration and configuration information requests from wireless radio devices (including requests from those wireless radio devices belonging to a different regulatory domain), registering a wireless radio device based on its location, identifying and providing regulatory domain information (e.g. a country code) to a wireless radio device based on its location, identifying and providing radio configuration information to a wireless radio device based on its location, identifying and providing channel configuration information to a wireless radio device based on its location, enforcing wireless radio device membership in one or more regulatory domains, and redirecting the wireless radio device to another system or server more appropriate for the regulatory domain if the server 12 is not configured to assist the radio device based on the location of the radio device (which may be realized by coordination with one or more other systems or servers).

The server 12 may also be configured to store a database 16 that contains data that is used by the spectrum allocation function 13 and the regulatory domain management function 14. This data may include geographic location information, associated regulatory domain information, and information relating to operating parameter(s) corresponding to the regulatory domain. Furthermore, the database may include information pertaining to one or more wireless radio devices that have registered with the server, or one or more incumbent wireless radio devices.

In one embodiment, the spectrum allocation function 13 and regulatory domain management function 14 are respectively embodied as one or more computer programs (e.g., one or more software applications including compilations of executable code). The computer program(s) and/or database 16 may be stored on a non-transitory machine (e.g., computer) readable medium, such as a memory in the form of a magnetic, optical or electronic storage device (e.g., hard disk, optical disk, flash memory, etc.). For example, as illustrated in FIG. 1, the server 12 may have a memory 20 for storing data, logic routine instructions, computer programs, files, operating system instructions, and the like. The memory 20 may comprise several devices, including volatile and non-volatile memory components. Accordingly, the memory 20 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices.

To execute one or more of the spectrum allocation function 13 or regulatory domain management function 14, the server 12 may include one or more processors 18 used to execute instructions that carry out a specified logic routine(s). The processor 18 and the components of the memory 20 may be coupled using a local interface 22. The local interface 22 may be, for example, a data bus with accompanying control bus, a network, or other subsystem.

The server 12 may have various video and input/output (I/O) interfaces 24 as well as one or more communications interfaces 26. The interfaces 24 may be used to operatively couple the system 10 to various peripherals, such as a display 28, a keyboard 30, a mouse 32, other input devices, a microphone (not shown), a camera (not shown), a scanner (not shown), a printer (not shown), a speaker (not shown) and so forth. The communications interfaces 26 may include for example, a modem and/or a network interface card. The communications interfaces 26 may enable the server 12 to send and receive data signals, voice signals, video signals, and the like to and from other computing devices via an external network 34 (e.g., the Internet, a wide area network (WAN), a local area network (LAN), direct data link, or similar systems). The interface between the server 12 and any operatively interfaced device or network may be wired or wireless.

The memory 20 may store an operating system 36 that is executed by the processor 18 to control the allocation and usage of resources in the server 12, as well as provide basic user interface features. Specifically, the operating system 36 controls the allocation and usage of the memory 20, the processing time of the processor 18 dedicated to various applications being executed by the processor 18, and the peripheral devices, as well as performing other functionality. In this manner, the operating system 36 serves as the foundation on which applications, such as the spectrum allocation function 13 and regulatory domain management function 14, depend as is generally known by those with ordinary skill in the art. The operating system 36 also may control much of the user interface environment presented to a user, such as features of the overall graphical user interface (GUI) for the system 10.

The illustrated example includes one or more incumbent spectrum devices (and/or systems) 44a through 44n. Incumbent spectrum devices 44a through 44n may have priority to certain spectrum or have "grandfather" provisions so as to have access to certain spectrum. Exemplary incumbent devices to spectrum in the historical analog TV broadcast channels are TV stations that now broadcast using digital signals. Other exemplary incumbent systems and/or devices to spectrum in the historical analog TV broadcast channels are wireless microphone systems and devices.

The illustrated example further includes one or more wireless radio devices (or systems) 48a through 48n. In the exemplary context of managing spectrum for TV whitespace, the wireless radio devices 48a through 48n may include such devices as, e.g. TV whitespace band radios (TVBDs), mobile telephones, etc. With the transition of analog TV broadcasts to digital TV broadcasts, these devices may seek registration in accordance with FCC 08-260 to gain access to TV whitespace. Each wireless radio device 48a through 48n may be an individual radio device or a network of radio devices. Also, each wireless radio device 48a through 48n may include at least one transceiver for engaging in wireless communications and a controller for managing radio system operation, including the below-described regulatory domain configuration functions.

It is contemplated that there may be hundreds or thousands of incumbent wireless radio devices 44a through 44n, and thousands or millions of other wireless radio devices 48a through 48n. Under current FCC procedure, the wireless radio devices 48a through 48n will request from the server 12 a channel map of available channels that may be used for a location every twenty-four hours. Also, for wireless radio devices 48a through 48n that do not have a fixed location (i.e., mobile wireless radio devices), the mobile wireless radio device will request from the server 12 a channel map of available channels each time the mobile wireless radio device changes location. Therefore, to handle the volume of the wireless radio devices 44 and 48, the server 12 may be scaled to handle a high volume of spectrum allocation requests and regulatory domain configuration requests. Furthermore, the server 12 may have a distributed architecture, and may include multiple server systems. The devices 44 and 48 may interact with the server 12 for registration purposes over the Internet using electronic messaging.

Figure 2:
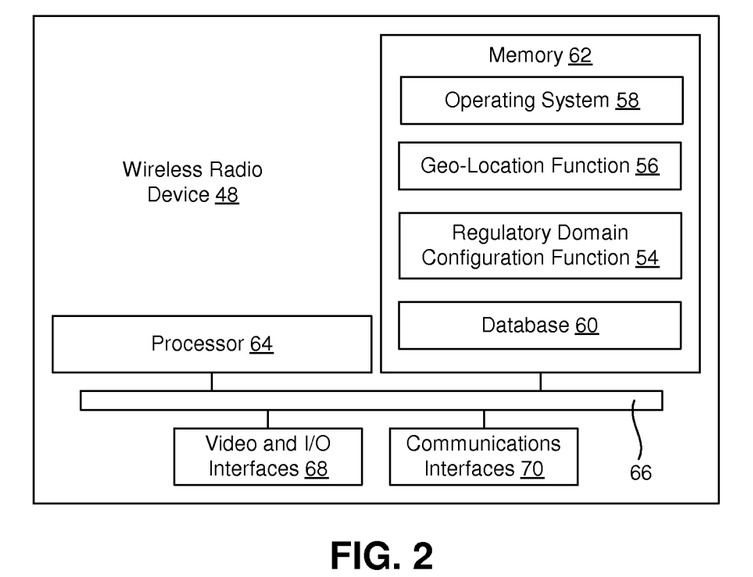
FIG. 2 is a schematic view of an exemplary wireless radio device.

FIG. 2 is a schematic view of an exemplary wireless radio device 48 illustrated in FIG. 1. The wireless radio device 48 may be configured to execute various functions for configuring operating parameters of the wireless radio device. As discussed in more detail below, the wireless radio device 48 may determine a geographic location in which the wireless radio device is located, and effectuate a determination of the regulatory domain in which the wireless radio device is located based at least in part on the determined geographic location. Operating parameters of the wireless radio device may then be determined in accordance with the determined regulatory domain.

More specifically, the wireless radio device 48 may be configured to execute a geo-location function 56 that is configured to determine the geographic location of the wireless radio device 48. The geo-location function 56 may determine geographic location in any appropriate manner. In one embodiment, location of the wireless radio device 48 may be determined using a triangulation method. A common triangulation method is by using a global position system (GPS) or assisted GPS (AGPS) approximation of location. In another embodiment, the geo-location function 56 may scan for, request, and/or receive location information from an external device such as a beacon. In one embodiment, the wireless radio device 48 may receive from the beacon information such as a postal address, street address, or zip code (e.g., in the United States a "zip+4" code may provide a sufficiently accurate location estimation). In yet another embodiment, the location of the wireless radio device 48 may be input by a user of the device.

The geographic location information obtained using the geo-location function 56 may be used by the wireless radio device 48 to determine the regulatory domain in which the wireless radio device 48 is located. In one embodiment, the determined geographic location is used by the regulatory domain configuration function 54 of the wireless radio device 48 to determine the regulatory domain in which the wireless radio device 48 is located. The regulatory domain configuration function 54 may match the geographic location information to geographic location information and associated regulatory domain information stored in the database 60 of the wireless radio device 48. In other embodiments, the location information is provided by the wireless radio device 48 to the server 12 for identification of the regulatory domain. As such, the regulatory domain may be determined by requesting regulatory domain information from a server, the request including the determined geographic location of the wireless radio device.

The regulatory domain configuration function 54 is also configured to perform registration functions such as providing a registration request to the server 12. Moreover, the regulatory domain configuration function 54 is configured to perform wireless radio device configuration functions such as providing a configuration information request from the wireless radio device 48, receiving a configuration information response from the server 12, and configuring the operating parameter(s) of the wireless radio device based at least in part on the configuration information response from the server. The details regarding the operation of the regulatory domain configuration function 54 are described in more detail below.

In one embodiment, the wireless radio device executes the geo-location function 56 and the regulatory domain configuration function 54 to enable support of the wireless radio device 48 for one or more regulatory domains. These functions may provide such functionalities as enabling the wireless radio device 48 to accept redirection from a server to another server 12, and enabling operation of the wireless radio device based on information provided by the server, and enabling the dynamic certification and configuration of the operating parameters of the wireless radio device 48 at startup.

The wireless radio device 48 may also include a database 60 that stores information used by the geo-location function 56, device registration function 54, and/or device operating parameter function 52. For example, the stored information may include device identification information, certification information for one or more regulatory domains, radio configuration information for one or more regulatory domains, designated/default server contact information for a given regulatory domain, correspondence information between geographic location information and regulatory domains, device identification information (e.g. an FCC identifier (FCC id), device serial number, contact information of a responsible person or entity, etc.), etc.

In one embodiment, the geo-location function 56 and regulatory domain configuration function 54 are respectively embodied as one or more computer programs (e.g., one or more software applications including compilations of executable code). The computer program(s) and/or database 60 may be stored on a non-transitory machine (e.g., computer) readable medium at the device, such as a memory in the form of a magnetic, optical or electronic storage device (e.g., hard disk, optical disk, flash memory, etc.). As illustrated, the wireless radio device 48 may have a memory 62 for storing data, logic routine instructions, computer programs, files, operating system instructions, and the like. The memory 62 may comprise several devices, including volatile and non-volatile memory components. Accordingly, the memory 62 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices.

To execute one or more of the geo-location function 56 and the regulatory domain configuration function 54, the wireless radio device 48 may include one or more processors 64 used to execute instructions that carry out a specified logic routine(s). The processor 64 and the components of the memory 62 may be coupled using a local interface 66. The local interface 66 may be, for example, a data bus with accompanying control bus, a network, or other subsystem.

The wireless radio device 48 may have various video and input/output (I/O) interfaces 68 as well as one or more communications interfaces 70. The (I/O) interfaces 68 may be used to operatively couple the wireless radio device to various peripherals (not shown), such as a display, a keyboard, a mouse, other input devices, a microphone, a camera, a scanner, a printer, a speaker, and so forth. The communications interfaces 70 may enable the wireless radio device to send and receive data signals, voice signals, video signals, and the like to and from other computing devices such as the server. Additionally, the communications interfaces 70 may include one or more wireless transceivers for engaging in wireless communications.

The memory 62 may store an operating system 58 that is executed by the processor 64 to control the allocation and usage of resources in the wireless radio device 48, as well as provide basic user interface features. Specifically, the operating system 58 controls the allocation and usage of the memory 62, the processing time of the processor 64 dedicated to various applications being executed by the processor 64, and the peripheral devices, as well as performing other functionality. In this manner, the operating system 58 serves as the foundation on which applications, such as the geo-location function 56 and regulatory domain configuration function 54, as is generally known by those with ordinary skill in the art.

The operating system 58 also may control much of the user interface environment presented to a user, such as features of the overall graphical user interface (GUI) for the wireless radio device 48.

The above-described features provide for the automatic configuration of a wireless radio device in accordance with a wireless regulatory domain in which the wireless radio device is located. The wireless radio device is capable of interacting with the server in order to receive, determine, and/or select configuration information such as the regulatory domain in which the wireless radio device is located and/or one or more appropriate operating parameters associated with that regulatory domain. The wireless radio device is therefore supported by, and may be dynamically configured and/or reconfigured for use in, multiple regulatory domains.

Figure 3A:
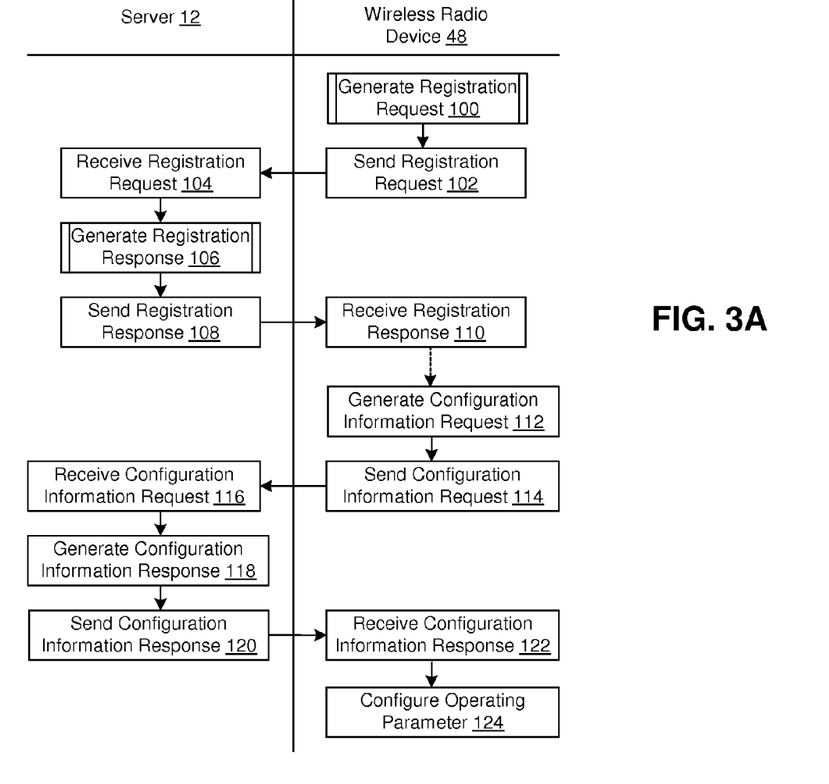
FIG. 3A is a flow diagram representing exemplary actions taken by various components of the system of FIG. 1.

FIG. 3A illustrates a first embodiment of automatically configuring operating parameters of a wireless device. This embodiment includes a registration of the wireless radio device with the server 12. Such an embodiment may be utilized in the context of a relatively fixed or stationary wireless radio device (e.g., a device having a low probability of operating in a regulatory domain different than the regulatory domain in which the wireless radio device is initially deployed and operated).

Steps carried out by the server 12 and wireless radio device 48 are illustrated. Therefore, the exemplary methods may be carried out, in part, by executing an embodiment of the spectrum allocation function 13 and regulatory domain management function 14 of the server 12 and, in part, by executing an embodiment of the geo-location function 56 and regulatory domain configuration function 54 of the wireless radio device 48. Although the flow chart shows a specific order of executing functional logic blocks, the order of executing the blocks may be changed relative to the order shown. Also, two or more blocks shown in succession may be executed concurrently or with partial concurrence. For example, while the following embodiment illustrates separate registration and configuration processes, a single request from a wireless radio device may include both a registration request and a configuration information request. Furthermore, one or more of the functional logic blocks may be omitted. For example, it is possible that only the functional logic blocks associated with the registration process (e.g., blocks 100-110) or only the functional logic blocks associated with the configuration information process (e.g., blocks 112-124) may be carried out. It is also possible that only the functional logic blocks associated with the configuration process may be carried out.

The described functions may be repeated for all wireless radio devices so that appropriate spectrum certificates are provided to each qualified spectrum user. Also, even though an order flow of steps is illustrated, the functionality may be carried out in a state-driven manner and/or an object-oriented manner.

An exemplary registration process for the wireless radio device 48 may commence in block 100 where the wireless radio device 48 generates a registration request. A flow diagram illustrating an exemplary registration request generation process performed at a wireless radio device is provided in FIG. 4.

Figure 4:
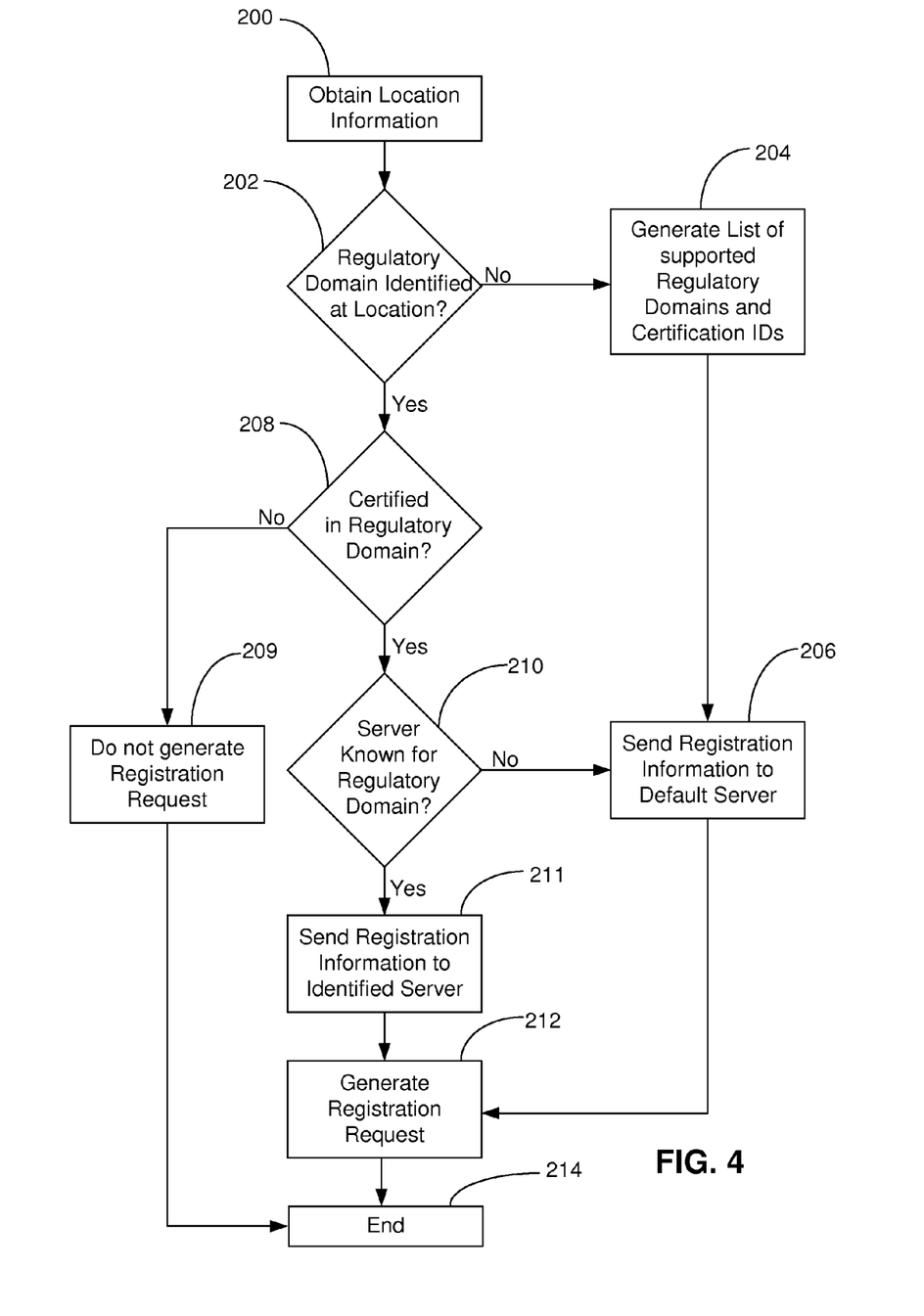
FIG. 4 is a flow diagram representing an exemplary registration request generation process performed at a wireless radio device.

Specifically, at block 200, the wireless radio device 48 obtains location information of the wireless radio device using the geo-location function 56. As described above, the geographic location of the wireless radio device 48 may be obtained in any appropriate manner (e.g., location request from supporting network, GPS, beacon, user entry, etc.). In some embodiments, the wireless radio device 48 further determines the regulatory domain in which the wireless radio device is located using the regulatory domain configuration function 54. For example, the wireless radio device may compare or utilize the obtained location information with regulatory domain information stored on the device (e.g., in database 60 of the wireless radio device). Accordingly, at block 202, it is determined if a regulatory domain is identified for the location of the wireless radio device.

If a regulatory domain is not identified in block 202, a list of supported regulatory domains and certification IDs to be included in registration request message is generated at block 204. This information may be stored in the database 60 of the wireless radio device. As further illustrated at block 206, it is specified that this generated list of supported regulatory domains and certification IDs is to be sent to a default server. The information regarding the default server may also be stored in database 60. Accordingly, at block 212, the registration request is generated and includes a list of supported regulatory domains and associated certification IDs, as well as the information regarding the identified geographic location of the wireless radio device, to be sent to the default server. The registration request generation process ends at block 214.

If the regulatory domain is identified in block 202, it may further be determined with the wireless radio device 48 whether the wireless radio device is certified for that regulatory domain at block 208. This determination may be made by comparing the identified regulatory domain to information (e.g., one or more listed regulatory domains) contained within the database 60. If it is determined that the wireless radio device 48 is not certified in the identified regulatory domain, then the registration request generation process proceeds to block 209 where it is specified that a registration request is not to be generated for sending to the server 12. The registration request generation process ends at block 214. A message may be provided (e.g., via a display of the wireless radio device) that the wireless radio device is not certified for the identified regulatory domain.

If it is determined in block 208 that the wireless radio device 48 is certified in the identified regulatory domain, then it may further be determined with the wireless radio device 48 at step 210 if the server is known for the identified regulatory domain. If the server is not known, then it is specified at block 206 that the registration request is to be sent to a default server. The identity of the default server may be stored in the database 60. Accordingly, at block 212, the registration request is generated and includes the identified regulatory domain and associated certification ID to be sent to the default server. The registration request may also include the information regarding the identified geographic location of the wireless radio device. The registration request generation process ends at block 214.

If the server is known for the identified regulatory domain, then it is specified at block 211 that the registration request is to be sent to the identified server. The identity of the server associated with the identified regulatory domain may be stored in the database 60. Accordingly, at block 212, the registration request is generated and includes the identified regulatory domain and associated certification ID to be sent to the associated server. The registration request may also include the information regarding the identified geographic location of the wireless radio device. The registration request generation process ends at block 214.

As described above, the registration request generated by the wireless radio device may include an identified regulatory domain or list of regulatory domains, one or more certification IDs, and/or information regarding the identified geographic location of the wireless radio device. The registration request may include other information such as device identification information (e.g. an FCC identifier (FCC id), device type, device serial number, contact information of a responsible person or entity, radio type, antenna height, etc.), one or more supported bands of operation, and any other appropriate information.

With continued reference to FIG. 3A, the wireless radio device 48 sends the registration request to the server 12 in block 102. As discussed above, in different embodiments, the registration request may be sent to one of plural possible servers. For example, if the regulatory domain and associated server are known, then the wireless radio device 48 may send the registration request to the server associated with that regulatory domain. In other embodiments, the registration request may instead be sent to a default server.

Figure 5:
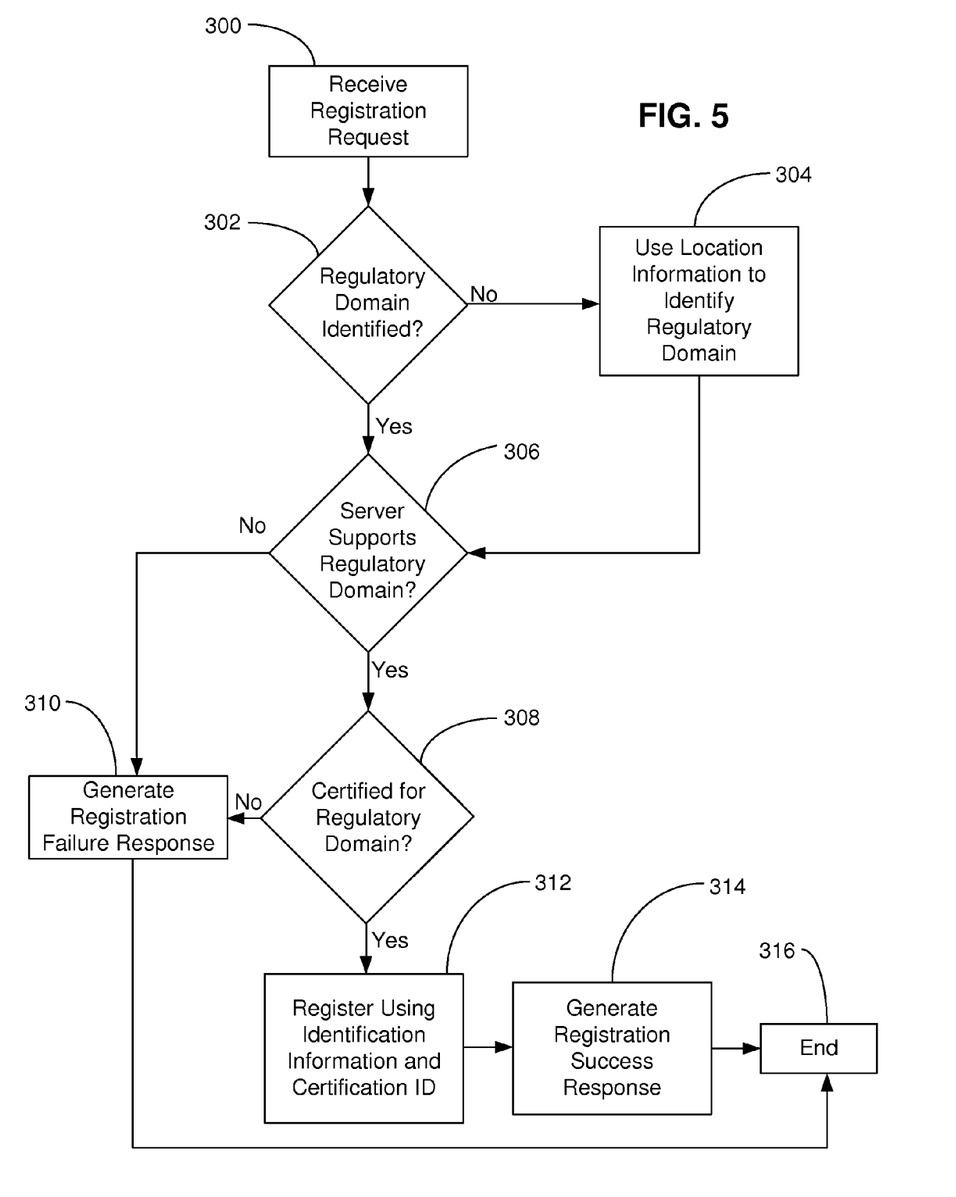
FIG. 5 is a flow diagram representing an exemplary registration response generation process performed at a server.

In block 104, the registration request may be received by the server 12. Then, in block 106, the server 12 may generate a registration response based at least in part on the registration request. That is, the server may determine a registration response in accordance with a regulatory domain associated with the geographic location of the wireless radio device. A flow diagram illustrating an exemplary registration response generation process performed at a server is shown in FIG. 5.

Specifically, at block 300, the server receives a registration request from a wireless radio device. As discussed above, the registration request may include information such as an identified regulatory domain or list of regulatory domains, one or more certification IDs, and/or information regarding the identified geographic location of the wireless radio device. The registration request may include other information such as device identification information (e.g. an FCC identifier (FCC id), device type, device serial number, contact information of a responsible person or entity, radio type, antenna height, etc.), one or more supported bands of operation, and any other appropriate information. The information provided in the registration request may be stored on the server in association with registration of the wireless radio device.

At block 302, a determination is made as to whether there is an indication that the wireless radio device 48 is located in an identified regulatory domain (i.e., if a specifically-identified regulatory domain is included in the registration request). If no specifically-identified regulatory domain is identified, the server 12 uses the location information provided by the wireless radio device 48 to identify the regulatory domain in which the wireless radio device 48 is located at block 304. If a regulatory domain is identified, the server 12 uses that regulatory domain in processing the registration request. Even if a regulatory domain is identified, the server 12 may still independently identify and/or verify the regulatory domain in which the wireless radio device 48 is located using the location information provided by the wireless radio device.

A determination is made at block 306 as to whether the identified regulatory domain is supported by the server 12. As discussed above, the server 12 may be one of multiple server systems and the registration request may be sent to a default server. Therefore, it is possible that a server 12 may receive a registration request from a wireless radio device 48 in a regulatory domain that is not supported by the server 12. In such a situation, in response to a negative determination made in block 306 the server 12 may generate a registration failure response (block 310) and end the registration response generation process (block 316). In other embodiments, the server may redirect the registration request to a different server, or may include information regarding a more appropriate server in the registration failure response.

If the identified regulatory domain is supported by the server, it is determined at block 308 whether the wireless radio device 48 is certified for the identified regulatory domain. If it is determined in block 308 that the wireless radio device 48 is certified for the identified regulatory domain, the wireless radio device is registered with the server 12 (e.g., using the wireless radio device's identification information, certification ID, etc.) at block 312. A registration success response is generated at block 314 and the registration response generation process is ended at block 316.

While the present disclosure provides the ability of a wireless radio device 48 to be supported in multiple regulatory domains, it is not required that the wireless radio device be supported in every regulatory domain. Therefore, it is possible that a wireless radio device may be located in a regulatory domain that the wireless radio device is not certified for use. In such a situation, in response to a negative determination made at block 308, the server 12 may generate a registration failure response (block 310) and end the registration response generation process (block 316).

With continued reference to FIG. 3A, the logical flow may continue in block 108 where the registration response (failure from block 310 or success from block 314) is sent to the wireless radio device 48. The registration response may include other information, e.g. regulatory domain information associated with the location of the wireless radio device. In block 110, the registration response is received and may be stored and/or displayed at the wireless radio device.

Subsequent operation of the wireless radio device may depend on the registration response transmitted to the wireless radio device. For example, in an embodiment wherein the registration response indicates a failure to register, the wireless radio device may send a subsequent registration request to a different server. The identity of the different server may be provided in the registration response transmitted to the wireless radio device, or may be stored at the wireless radio device (e.g., as a default server or secondary default server). This subsequent registration request process may proceed in a manner similar to blocks 100-110.

In an embodiment where the registration response indicates a successful registration, the wireless radio device 48 may generate a configuration information request at block 112. The configuration information request may be generated for determining an identification of available channel(s) on which the wireless radio device 48 may carry out wireless communication and/or an identification of radio configuration parameter(s) (e.g., maximum transmit power) that may be utilized by the wireless radio device 48 in complying with operation regulations within the regulatory domain. The configuration information request generated and sent by the wireless radio device 48 may include some or all of the information used or determined in accordance with the registration of the wireless radio device (e.g., location information of the wireless radio device, regulatory domain information associated with the location of the wireless radio device, certification information for one or more regulatory domains, device identification information, one or more supported bands of operation, a list of one or more supported regulatory domains, radio type, antenna height, supported communications protocols, and any other appropriate information). In other embodiments, the configuration information request simply includes device identification information (e.g., a device ID) and the device identification information may be used by the server for identifying information associated with the wireless radio device previously stored on the server (e.g., in association with registration of the wireless radio device with the server) for generating a configuration information response.

With continued reference to FIG. 3A, the wireless radio device 48 sends the configuration information request to the server 12 in block 114. In block 116, the configuration information request is received by the server 12. Then, in block 118, the server 12 may generate a configuration information response using the regulatory domain management function 14. The configuration information includes information for configuring the operating parameters of the wireless radio device. The configuration information response may include regulatory domain information, radio configuration parameters for the corresponding regulatory domain, and/or a channel list identifying one or more available channels.

Because the wireless radio device has previously been registered with the server, generation of the configuration information response may be performed using the identified regulatory domain and the associated certification ID. In the illustrated embodiment, the regulatory domain in which the wireless radio device is located has already been identified, and the wireless radio device has already been determined to be supported and certified for the identified regulatory domain via the registration process. Such information may be stored at the server 12 and/or the wireless radio device 48. Therefore, the configuration information response may be generated using such information as well as any other information used by the server 12 for spectrum allocation. For example, the server 12 may generate the configuration information response using elevation information associated with the geographic location of the wireless radio device 48. Although in another embodiment, the configuration information response generation process may be performed in accordance with that described below in relation to FIG. 7. Hence, the server may determine configuration information in accordance with a regulatory domain associated with the geographic location of the wireless radio device, and provide the configuration information from the server to the wireless radio device The logical flow may continue in block 120 where the configuration information response is sent to the wireless radio device 48. In block 122, the configuration information response is received. The configuration information response may be stored by the wireless radio device The wireless radio device automatically configures the operating parameters of the of the wireless radio device in accordance with configuration parameters associated with the determined regulatory domain (block 124) and commences operation in accordance with the radio configuration parameter(s) (e.g., maximum transmit power, a white space channel map, etc.). In some embodiments, the configuration parameter(s) are provided with the configuration information response and are used in configuring the wireless radio device 48. In other embodiments, one or more of the configuration parameters are stored at the wireless radio device 48, and such configuration parameter(s) is selected based on the determined regulatory domain provided in the configuration information response. Hence, the wireless radio device is configured in accordance with configuration parameters associated with the determined wireless regulatory domain of the wireless device.

It is contemplated that the described configuration process (e.g., blocks 112-124) may be performed multiple times after the registration process without the need to re-register with the server. The dashed arrow connecting blocks 110 and 112 in FIG. 3A illustrates that it is not necessary for the device to register with the server (e.g., blocks 100-110) prior to each configuration information request (e.g., blocks 112-124).

Therefore, the process of requesting configuration information may be expedited. This arrangement may be used, for example, to expedite the current FCC procedure wherein a wireless radio device is required to request from the server a channel map of available channels that may be used for a location every twenty-four hours.

In other embodiments, the registration and/or the configuration process can be performed upon a specific event, such as during booting of the wireless radio device, or the wireless radio device may periodically monitor its location to determine when registration and/or configuration is to be performed.

The principles of the present disclosure provide advantages associated with multi-regulatory domain distribution of wireless radio devices by addressing the shortcomings associated with conventional wireless device configuration. Accordingly, a wireless radio device may be dynamically configured in accordance with a country code of a regulatory domain upon initialization, and without user involvement to specify a country code or regulatory domain value. Hence, the manufacturer or distributor is not required to configure a country code before shipping the product to the customer. The regulatory domains are assured the device will be configured with the proper country code and operate using the proper country based rules because the wireless radio device utilizes geographic location to determine its location and queries a server that controls the country code and associated operating parameter configuration to match the country where the wireless radio device is deployed. Smaller spare inventories may also be kept by the manufacturer.

Figure 3B:
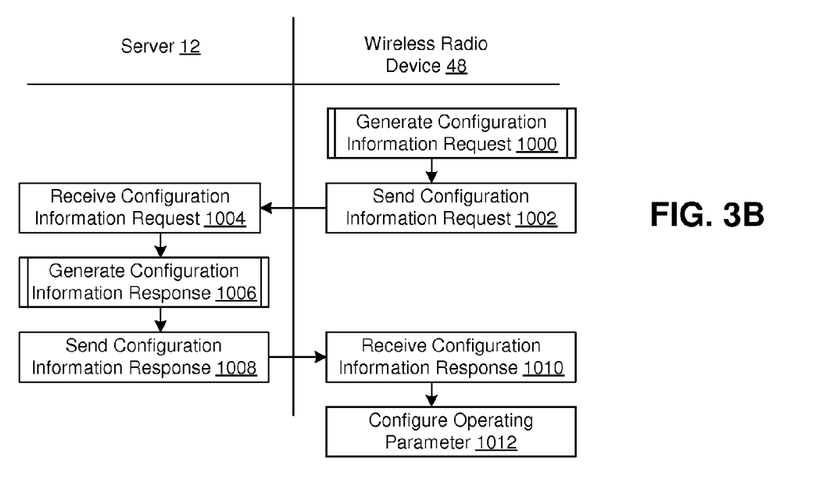
FIG. 3B is a flow diagram representing exemplary actions taken by various components of the system of FIG. 1.

FIG. 3B illustrates a second embodiment of automatically configuring operating parameters of a wireless device. This embodiment does not include a separate registration of the wireless radio device with the server 12. Such an embodiment may be utilized in the context of a portable wireless radio device (e.g., a device having a higher probability of operating in a regulatory domain different than the regulatory domain in which the wireless radio device is initially deployed and operated).

Similar to the first embodiment described above, steps carried out by the server 12 and wireless radio device 48 are illustrated. Therefore, the exemplary methods may be carried out, in part, by executing an embodiment of the spectrum allocation function 13 and regulatory domain management function 14 of the server 12 and, in part, by executing an embodiment of the geo-location function 56 and regulatory domain configuration function 54 of the wireless radio device 48. Although the flow chart shows a specific order of executing functional logic blocks, the order of executing the blocks may be changed relative to the order shown. Also, two or more blocks shown in succession may be executed concurrently or with partial concurrence. For example, while the following embodiment illustrates separate registration and configuration processes, a single request from a wireless radio device may include both a registration request and a configuration information request. Furthermore, one or more of the functional logic blocks may be omitted.

The described functions may be repeated for all wireless radio devices so that appropriate spectrum certificates are provided to each qualified spectrum user. Also, even though an order flow of steps is illustrated, the functionality may be carried out in a state-driven manner and/or an object-oriented manner.

An exemplary configuration process for the wireless radio device 48 may commence in block 1000 where the wireless radio device 48 generates a configuration information request. A flow diagram illustrating an exemplary configuration information request generation process performed at a wireless radio device is provided in FIG. 6.

Figure 6:
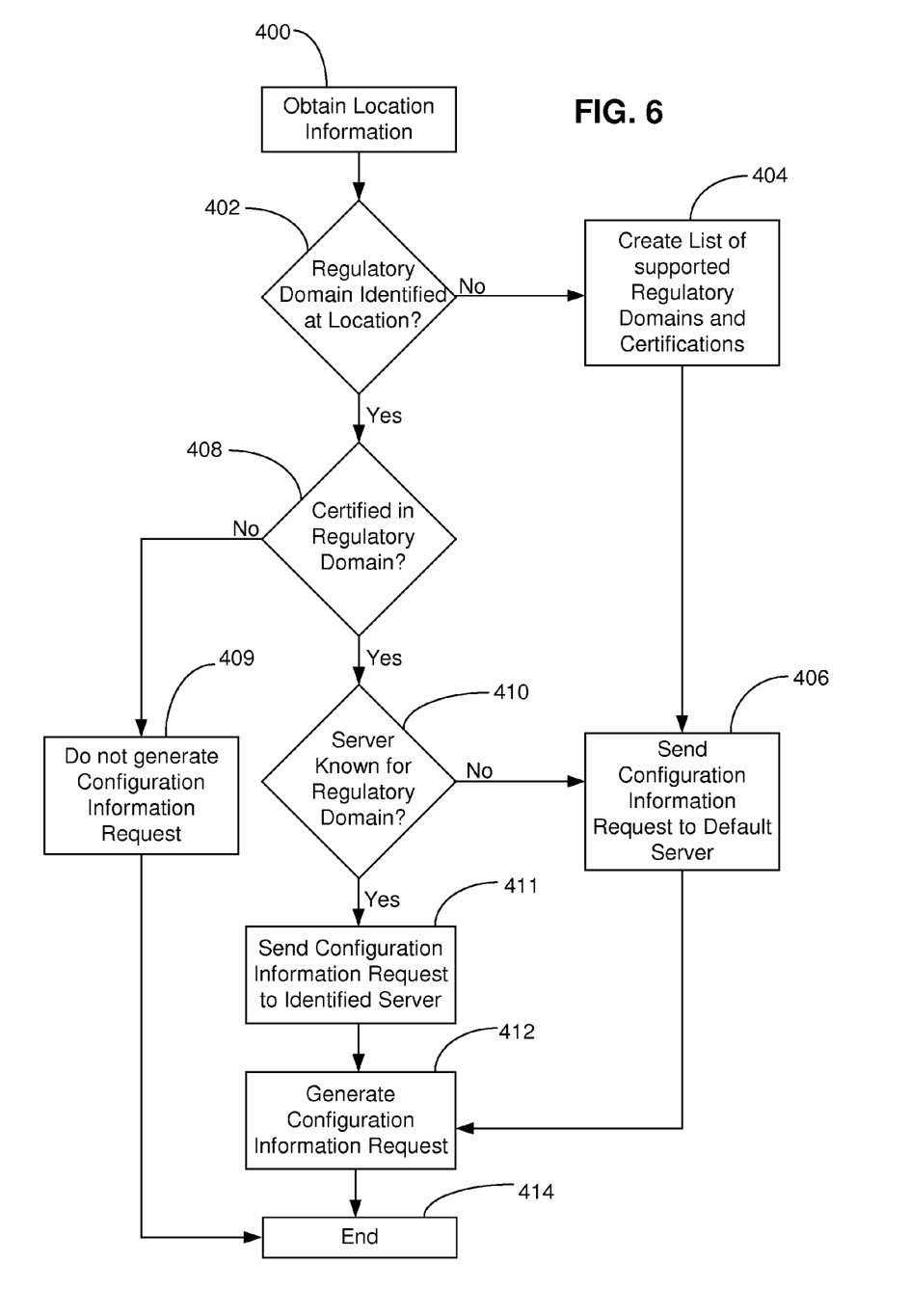
FIG. 6 is a flow diagram representing an exemplary configuration information request generation process performed at a wireless radio device.

At block 400, the wireless radio device 48 obtains location information of the wireless radio device using the geo-location function 56. As described above, the geographic location of the wireless radio device 48 may be obtained in any appropriate manner (e.g., location request from supporting network, GPS, beacon, user entry, etc.). In some embodiments, the wireless radio device 48 further determines the regulatory domain in which the wireless radio device is located using the regulatory domain configuration function 54. In such an embodiment, the wireless radio device may compare or utilize the obtained location information with regulatory domain information stored on the device (e.g., in database 60 of the wireless radio device). Accordingly, at block 402, it is determined if a regulatory domain is identified for the location of the wireless radio device.

If a regulatory domain is not identified in block 402, a list of supported regulatory domains and certification IDs to be included in the configuration information request message is generated at block 404. This information may be stored in the database 60 of the wireless radio device. As further illustrated at block 406, it is specified that this generated list of supported regulatory domains and certification IDs is to be sent to a default server. The information regarding the default server may also be stored in database 60. Accordingly, at block 412, the configuration information request is generated and includes a list of supported regulatory domains and associated certification IDs, as well as the information regarding the identified geographic location of the wireless radio device, to be sent to the default server. The configuration information request generation process ends at block 414.

If the regulatory domain is identified in block 402, it may further be determined with the wireless radio device 48 whether the wireless radio device is certified for that regulatory domain at block 408. This determination may be made by comparing the identified regulatory domain to information (e.g., one or more listed regulatory domains) contained within the database 60. If it is determined that the wireless radio device 48 is not certified in the identified regulatory domain, then the configuration process proceeds to block 409 where it is specified that a configuration information request is not to be generated for sending to the server 12. The configuration information request generation process ends at block 414 and a message may be provided (e.g., via a display of the wireless radio device) that the wireless radio device is not certified for the identified regulatory domain.

If it is determined that the wireless radio device 48 is certified in the identified regulatory domain, then it may further be determined at step 410 if the server is known for the identified regulatory domain. If the server is not known, then it is specified that at block 406 that the configuration information request is to be sent to a default server. The identity of the default server may be stored in the database 60. Accordingly, at block 412, the configuration information request is generated and includes the identified regulatory domain and associated certification ID to be sent to the default server. The configuration information request may also include the information regarding the identified geographic location of the wireless radio device. The configuration information request generation process ends at block 414.

If the server is known, then it is specified at block 411 that the configuration information request is to be sent to the identified server. The identity of the server associated with the identified regulatory domain may be stored in the database 60. Accordingly, at block 412, the configuration information request is generated and includes the identified regulatory domain and associated certification ID to be sent to the associated server. The configuration information request may also include the information regarding the identified geographic location of the wireless radio device. The configuration information request generation process ends at block 214.

As described above, the configuration information request generated by the wireless radio device may include an identified regulatory domain or list of regulatory domains, one or more certification IDs, and/or information regarding the identified geographic location of the wireless radio device. The configuration information request may include other information such as device identification information (e.g. an FCC identifier (FCC id), device type, device serial number, contact information of a responsible person or entity, radio type, antenna type, supported communications protocol, etc.), one or more supported bands of operation, and any other appropriate information.

With continued reference to FIG. 3B, the wireless radio device 48 sends the configuration information request to the server 12 in block 1002. As discussed above, in different embodiments, the configuration information request may be sent to one of plural possible servers. For example, if the regulatory domain and associated server are known, then the wireless radio device 48 may send the configuration information request to the server associated with that regulatory domain. In other embodiments, the configuration information request may instead be sent to a default server.

Figure 7:
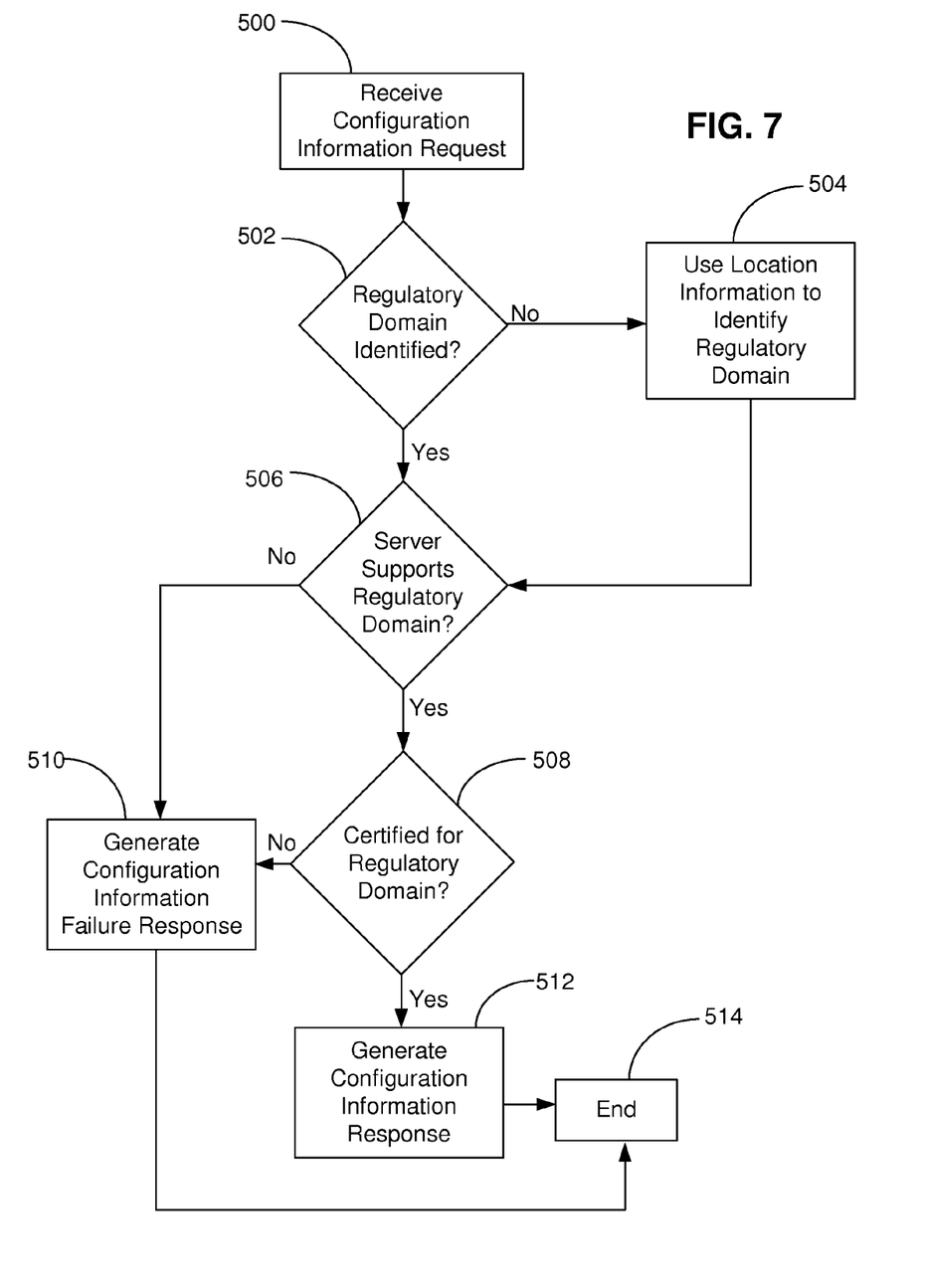
FIG. 7 is a flow diagram representing an exemplary configuration information response generation process performed at a server.

In block 1004, the configuration information request may be received by the server 12. Then, in block 1006, the server 12 may generate a configuration information response based at least in part on the configuration information request. That is, the server may determine configuration information in accordance with a regulatory domain associated with the geographic location of the wireless radio device, and provide the configuration information from the server to the wireless radio device, the configuration information including information for configuring the operating parameters of the wireless radio device. A flow diagram illustrating an exemplary configuration information response generation process performed at a server is shown in FIG. 7.

Specifically, at block 500, the server receives a configuration information request from a wireless radio device. As discussed above, the configuration information request may include an identified regulatory domain or list of regulatory domains, one or more certification IDs, and/or information regarding the identified geographic location of the wireless radio device. The configuration information request may include other information such as device identification information (e.g. an FCC identifier (FCC id), device type, device serial number, contact information of a responsible person or entity, radio type, antenna type, supported communications protocol, etc.), one or more supported bands of operation, and any other appropriate information. The information provided in the configuration information request may be stored on the server.

At block 502, a determination is made as to whether there is an indication that the wireless radio device 48 is located in an identified regulatory domain (i.e., if a specifically-identified regulatory domain is included in the configuration information request). If no specifically-identified regulatory domain is identified, the server 12 uses the location information provided by the wireless radio device 48 to identify the regulatory domain in which the wireless radio device 48 is located at block 304. If a regulatory domain is identified, the server 12 uses that regulatory domain in processing the configuration identification request. In some embodiments, even if a regulatory domain is identified, the server 12 may still independently identify or verify the regulatory domain in which the wireless radio device 48 is located using the location information provided by the wireless radio device.

A determination is then made at block 506 as to whether the identified regulatory domain is supported by the server 12. As discussed above, the server 12 may be one of multiple server systems. As further discussed above, the configuration information request may be sent to a default server. Therefore, it is possible that a server 12 may receive a configuration information request from a wireless radio device 48 in a regulatory domain that is not supported by the server 12. In such a situation, upon a negative determination at block 506, the server 12 may generate a configuration failure response (block 510) and end the configuration information response generation process (block 516). In other embodiments, the server may redirect the configuration information request to a different server, or may include information regarding a more appropriate server in the configuration failure response.

If the identified regulatory domain is supported by the server, it is determined at block 508 whether the wireless radio device 48 is certified for the identified regulatory domain. If it is determined that the wireless radio device 48 is certified for the identified regulatory domain, the server 12 generates a configuration information response at block 512. The configuration information response may include regulatory domain information, radio configuration parameters for the corresponding regulatory domain, and/or a channel list identifying one or more available channels. The configuration information response may be generated using information provided by the wireless radio device 48 and/or information determined by the server 12, as well as any other information used by the server 12 for spectrum allocation. For example, the server 12 may generate the configuration information response using elevation information associated with the geographic location of the wireless radio device 48. The configuration information response generation process is ended at block 514.

While the present disclosure provides the ability of a wireless radio device 48 to be supported in multiple regulatory domains, it is not required that the wireless radio device be supported in every regulatory domain. Therefore, it is possible that a wireless radio device may be located in a regulatory domain that the wireless radio device is not certified for use. In such a situation, upon a negative determination at block 508, the server 12 may generate a configuration information failure response (block 510) and end the configuration information response generation process (block 514).

With continued reference to FIG. 3B, the logical flow may continue in block 1008 where the configuration information response is sent to the wireless radio device 48. In block 1010, the configuration information response is received. The configuration information response may be stored by the wireless radio device The wireless radio device automatically configures the operating parameter(s) (e.g., maximum transmit power, a white space channel map, etc.) of the of the wireless radio device in accordance with configuration parameters associated with the determined regulatory domain (block 1012) and commences operation in accordance with the radio configuration parameter(s). In some embodiments, the configuration parameter(s) are provided with the configuration information response and are used in configuring the wireless radio device 48. In other embodiments, one or more of the configuration parameters are stored at the wireless radio device 48, and such configuration parameter(s) is selected based on the determined regulatory domain provided in the configuration information response. Hence, the wireless radio device is configured in accordance with configuration parameters associated with the determined wireless regulatory domain of the wireless device.

In addition to the advantages described above, the principles of the present disclosure further provide the advantage of allowing the country code and associated operating parameters of a wireless radio device to be dynamically reconfigured upon entry of the wireless radio device into a different regulatory domain. As such, a regulatory domain country code and associated operating parameter may replace previously stored country code and associated operating parameter information. For example, a wireless radio device (e.g., a mobile telephone) that is taken to a different regulatory domain may be dynamically reconfigured to conform to the operational parameters of that regulatory domain. This dynamic reconfiguration can be performed upon a specific event, such as during booting of the wireless radio device, or the wireless radio device may periodically monitor its location to determine when reconfiguration is to be performed.

Although particular embodiments of the invention have been described in detail, it is understood that the invention is not limited correspondingly in scope, but includes all changes, modifications, and equivalents coming within the spirit and terms of the claims appended hereto.

What is claimed is:

1. A method of automatically configuring operating parameters of a wireless radio device, comprising:
    determining, with the wireless radio device, a geographic location of the wireless radio device;
    determining the regulatory domain in which the wireless radio device is located based on the geographic location of the wireless radio device, wherein the regulatory domain is determined by:
        requesting regulatory domain information from a server, the request comprising the geographic location of the wireless radio device; and
        receiving an identification of the regulatory domain from the server in response to the request; and
    configuring, with the wireless radio device, the operating parameters of the wireless radio device in accordance with configuration parameters associated with the determined regulatory domain.

2. The method of claim 1, wherein the request further comprises at least one of device identification information, device type, or one or more supported bands of operation.

3. The method of claim 1, further comprising receiving the configuration parameters associated with the determined regulatory domain from the server in response to the request.

4. The method of claim 1, wherein the configuration parameters are stored at the wireless radio device, and the configuration parameters are selected based on the received identification of the determined regulatory domain.

5. The method of claim 1, wherein the configuration parameters comprise maximum transmit power.

6. The method of claim 1, wherein the configuration parameters comprise at least one available channel.

7. The method of claim 1, wherein the request further comprises at least one of a list of one or more supported regulatory domains or certification information associated with one or more supported regulatory domains.

8. The method of claim 1, wherein the identification of the regulatory domain received from the server comprises a country code corresponding to the regulatory domain.

9. A method of automatically configuring operating parameters of a wireless radio device, comprising:
    receiving a configuration information request from a wireless radio device, the configuration information request comprising information associated with a geographic location of the wireless radio device;
    determining, with a server, configuration information in accordance with the geographic location of the wireless radio device, the configuration information comprising an identification of the regulatory domain associated with the geographic location of the wireless radio device; and
    sending the configuration information comprising the identification of the regulatory domain from the server to the wireless radio device for configuring the operating parameters of the wireless radio device.

10. The method of claim 9, wherein the determined configuration information further comprises configuration parameters associated with the regulatory domain of the wireless radio device.

11. The method of claim 10, wherein the configuration parameters comprise at least one of maximum transmit power or an available channel.

12. The method of claim 9, wherein the configuration information request further comprises at least one of device identification information, device type, or one or more supported bands of operation.

13. The method of claim 9, wherein the server further determines the configuration information in accordance with elevation information associated with the geographic location of the wireless radio device.

14. The method of claim 9, wherein the configuration information request further comprises at least one of a list of one or more supported regulatory domains or certification information associated with one or more supported regulatory domains.

15. The method of claim 9, wherein the identification of the regulatory domain sent to the wireless radio device comprises a country code corresponding to the regulatory domain.

16. The method of claim 9, further comprising:
    determining, with the server, whether the wireless radio device is certified for the identified regulatory domain, wherein sending the configuration information to the wireless radio device is predicated on the wireless radio device being certified for the identified regulatory domain.

17. A wireless radio device configured to automatically configure operating parameters, the wireless radio device comprising:
    a geo-location function stored on a memory of the wireless radio device and executable by a processor of the wireless radio device to determine, with the wireless radio device, a geographic location of the wireless radio device; and
    a regulatory domain configuration function stored on the memory and executable by the processor to:
        determine the regulatory domain in which the wireless radio device is located based on the geographic location of the wireless radio device by:
            requesting regulatory domain information from a server, the request comprising the geographic location of the wireless radio device; and
            receiving an identification of the regulatory domain from the server in response to the request; and
        configure, with the wireless radio device, the operating parameters of the wireless radio device in accordance with configuration parameters associated with the determined regulatory domain.

18. The wireless radio device of claim 17, wherein the configuration parameters associated with the determined regulatory domain are received from the server in response to the request.

19. The wireless radio device of claim 17, wherein the configuration parameters are stored at the wireless radio device, and the configuration parameters are selected based on the received identification of the determined regulatory domain.

20. The wireless radio device of claim 17, wherein the regulatory domain configuration function is configured to include at least one of a list of one or more supported regulatory domains or certification information associated with one or more supported regulatory domains with the request.

21. The wireless radio device of claim 17, wherein the identification of the regulatory domain received from the server comprises a country code corresponding to the regulatory domain.

* * * * *